(12) United States Patent
Berger et al.

(10) Patent No.: US 6,581,477 B1
(45) Date of Patent: Jun. 24, 2003

(54) TORQUE SENSOR FOR A POWER ASSIST STEERING SYSTEM

(75) Inventors: Philip H. Berger, Troy, MI (US); Don Blandino, Sterling Heights, MI (US); Leonid V. Bogdanov, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/516,557

(22) Filed: Feb. 29, 2000

(51) Int. Cl.⁷ .................................. G01L 3/02
(52) U.S. Cl. .................................. 73/862.322
(58) Field of Search ............... 73/862.331, 118.1, 73/862.332; 701/41; 180/443

(56) References Cited

U.S. PATENT DOCUMENTS

| | | |
|---|---|---|
| 4,682,104 A | 7/1987 | Lombard et al. |
| 5,394,760 A | 3/1995 | Persson et al. ........ 73/862.331 |
| 5,442,956 A * | 8/1995 | Persson ................ 73/118.1 |

FOREIGN PATENT DOCUMENTS

DE 4232993 4/1994

* cited by examiner

Primary Examiner—Hezron Williams
Assistant Examiner—Octavia Davis
(74) Attorney, Agent, or Firm—Tarolli, Sundheim, Covell & Tummino L.L.P.

(57) ABSTRACT

A torque sensor (32) for a power assist steering system (10) for sensing applied torque between relatively rotatable input and output shafts (16, 17) which are connected by a torsion element (18) comprises an input transformer (T1) and a rotary transmitter (60) connected for rotation with the input shaft. The rotary transmitter (60) has a plurality of transmitter pole segments (108) defined by a plurality of slots (106). The rotary transmitter (60) includes a transmitter coil (70) electrically connected with the input transformer (T1). The transmitter coil (70) completely encircles each of the transmitter pole segments (108) individually and has two sections disposed in each of the plurality of slots (106). A rotary receiver (72) is axially spaced from the rotary transmitter (60) and is connected for rotation with the output shaft (17). The rotary receiver (72) includes a pair of one receiver coils (76, 78). Output transformers (T2, T3) are respectively electrically connected with the receiver coils (76, 78).

22 Claims, 5 Drawing Sheets

TORQUE SENSOR FOR A POWER ASSIST STEERING SYSTEM

TECHNICAL FIELD

The present invention is directed to the art of torque sensors and, more particularly, to a torque sensor for use in a power assist vehicle steering system.

BACKGROUND OF THE INVENTION

Power assist steering systems are well known in the art and are frequently employed for use with automotive vehicles. The power assist is accomplished by applying a supplementary rotary force to a steering member. Such systems may be controlled in response to a driver's applied torque to the vehicle's steering wheel. Some of the known systems provide steering assist using hydraulic power, while other known systems use electric power.

U.S. Pat. No. 4,682,104 discloses an angular displacement sensor for use in detecting applied steering torque between an input shaft and an output shaft. The shafts are coaxially aligned with each other and rotatable relative to each other about a common axis. The sensor includes an input rotary transformer which includes a stationary primary winding and a rotary secondary winding. The secondary winding is mounted on one face of an annular disc which is, in turn, mounted on the input shaft for rotation therewith. A pair of detection disks, including a transmitter disk and a receiver disk, are axially displaced from the input rotary transformer. The opposing faces of these disks carry identical planar coils. The coils extend in the shape of spirally wound sectors which are coiled alternately in opposing directions and which coaxially surround the common axis of the input and output shafts. An AC voltage applied to the primary winding of the input rotary transformer is applied to the planar coils on the transmitter disk. This causes a voltage to be induced in the planar coils mounted on the receiver disk. An output rotary transformer having a primary winding coaxially surrounds the output shaft. The output transformer includes a stationary secondary winding on another disk axially spaced from the primary winding of the output transformer. An output signal, which varies with angular deviation between the input and output shafts, is provided by the output transformer.

U.S. Pat. No. 5,442,956 discloses a torque sensor for a power assist steering system which is similar to the sensor of U.S. Pat. No. 4,682,104, but which does not employ a transmitter or receiver disk carrying planar coils wound alternately in opposing directions. Further, the torque sensor includes first and second coils wound on the receiver disk which are connected with first and second output rotary transformers, respectively.

SUMMARY OF THE INVENTION

The present invention is a torque sensor for a power assist steering system for sensing applied torque between relatively rotatable input and output shafts which are connected by a torsion element. The torque sensor comprises a rotary input transformer for providing an input signal and a rotary transmitter connected for rotation with the input shaft. The rotary transmitter has a radially extending transmitter face divided into a plurality of transmitter pole segments by a plurality of radially extending slots. The rotary transmitter includes a transmitter coil electrically connected with the rotary input transformer. The transmitter coil completely encircles each of the transmitter pole segments individually and has two sections disposed in each of the plurality of slots. A rotary receiver is axially spaced from the rotary transmitter and is connected for rotation with the output shaft. The rotary receiver includes at least one receiver coil. A rotary output transformer for providing an output signal is electrically connected with the at least one receiver coil.

In accordance with one aspect of the invention, the rotary receiver has a radially extending receiver face divided into a plurality of receiver pole segments by a plurality of radially extending receiver slots. The plurality of receiver pole segments comprises alternating first and second receiver pole segment pairs. Each of the first and second receiver pole segment pairs comprises an adjacent pair of the receiver pole segments. Each of the first receiver pole segment pairs is disposed circumferentially between two of the second receiver pole segment pairs and is separated from the second receiver pole segment pairs by a first group of the plurality of receiver slots in the receiver face. A second group of the plurality of receiver slots in the receiver face extends between each of the adjacent pairs of the receiver pole segments in each of the first and second receiver pole segment pairs.

The rotary receiver includes a first receiver coil and a second receiver coil. The first receiver coil completely encircles each of the first receiver pole segment pairs and has two sections disposed in each of first group of receiver slots separating the first and second receiver pole segment pairs. The second receiver coil completely encircles each of a plurality of combined receiver pole segment pairs comprising one of the first receiver pole segment pairs and an adjacently disposed one of the second receiver pole segment pairs. The second receiver coil has two sections disposed in each of the second group of receiver slots extending between each of the adjacent pairs of the receiver pole segments in each of the first and second receiver pole segment pairs. A first rotary output transformer is electrically connected with the first receiver coil and a second rotary output transformer is electrically connected with the second receiver coil.

BRIEF DESCRIPTION OF THE DRAWINGS

The foregoing and other features of the present invention will become apparent to those skilled in the art to which the present invention relates upon reading the following description with reference to the accompanying drawings, wherein.

DESCRIPTION OF A PREFERRED EMBODIMENT

Figure 1:
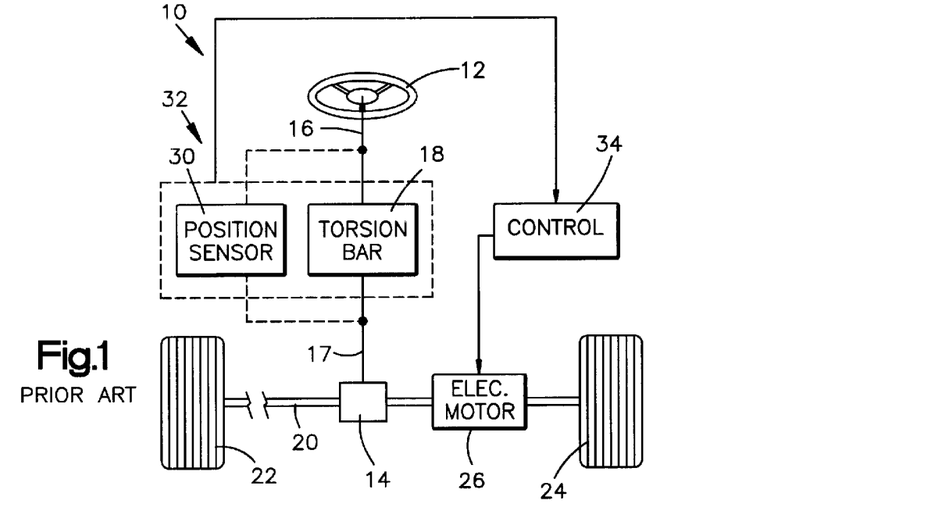
FIG. 1 is a schematic block diagram illustrating a power assist steering system having a torque sensor for sensing torque applied to a vehicle steering wheel.

Reference is now made to the drawings wherein the showings are for purposes of illustrating a preferred embodiment of the invention and not for purposes of limiting same. FIG. 1 illustrates a power assist steering system 10 including a steering wheel 12 operatively connected to a pinion gear 14. The steering wheel 12 is connected to an input shaft 16 and the pinion gear 14 is connected to an output shaft 17. The input shaft 16 is operatively connected to the output shaft 17 through a torsion bar 18. The torsion bar 18 twists in response to applied steering torque thereby permitting relative rotation between the input shaft 16 and the output shaft 17 about a common axis 19 (FIG. 2).

The pinion gear 14 has helical gear teeth (not shown) which meshingly engage with gear teeth (not shown) on a rack member 20. The pinion gear 14 in combination with the gear teeth on the rack member 20 form a rack and pinion gear set. The rack member 20 is coupled to the vehicle's steerable wheels 22, 24 with steering linkage in a known manner. When the steering wheel 12 is turned, the rack and pinion gear set converts the rotary motion of the steering wheel into a linear motion of the rack member 20. When the rack member 20 moves linearly, the steerable wheels 22, 24 pivot about their respective steering axes (not shown) and the vehicle is steered.

An electric assist motor 26 is drivingly connected to the rack member 20. When the electric motor 26 is energized, it provides power assist steering so as to aid in the rotation of the vehicle steering wheel 12 by the vehicle operator. A position sensor 30 is operatively connected across the input shaft 16 and the output shaft 17 and provides an electrical signal having a value representative of the relative rotational position between the input shaft and the output shaft. The position sensor 30 in combination with the torsion bar 18 form a torque sensor 32. The output signal of the torque sensor 32 is indicative of the applied steering torque to the vehicle steering wheel by the vehicle operator. The output signal from the torque sensor 32 is supplied to a control circuit 34 which processes the output signal and separates it into a directional signal and a magnitude signal, and then utilizes these signals to control the electric motor 26.

Figure 2:
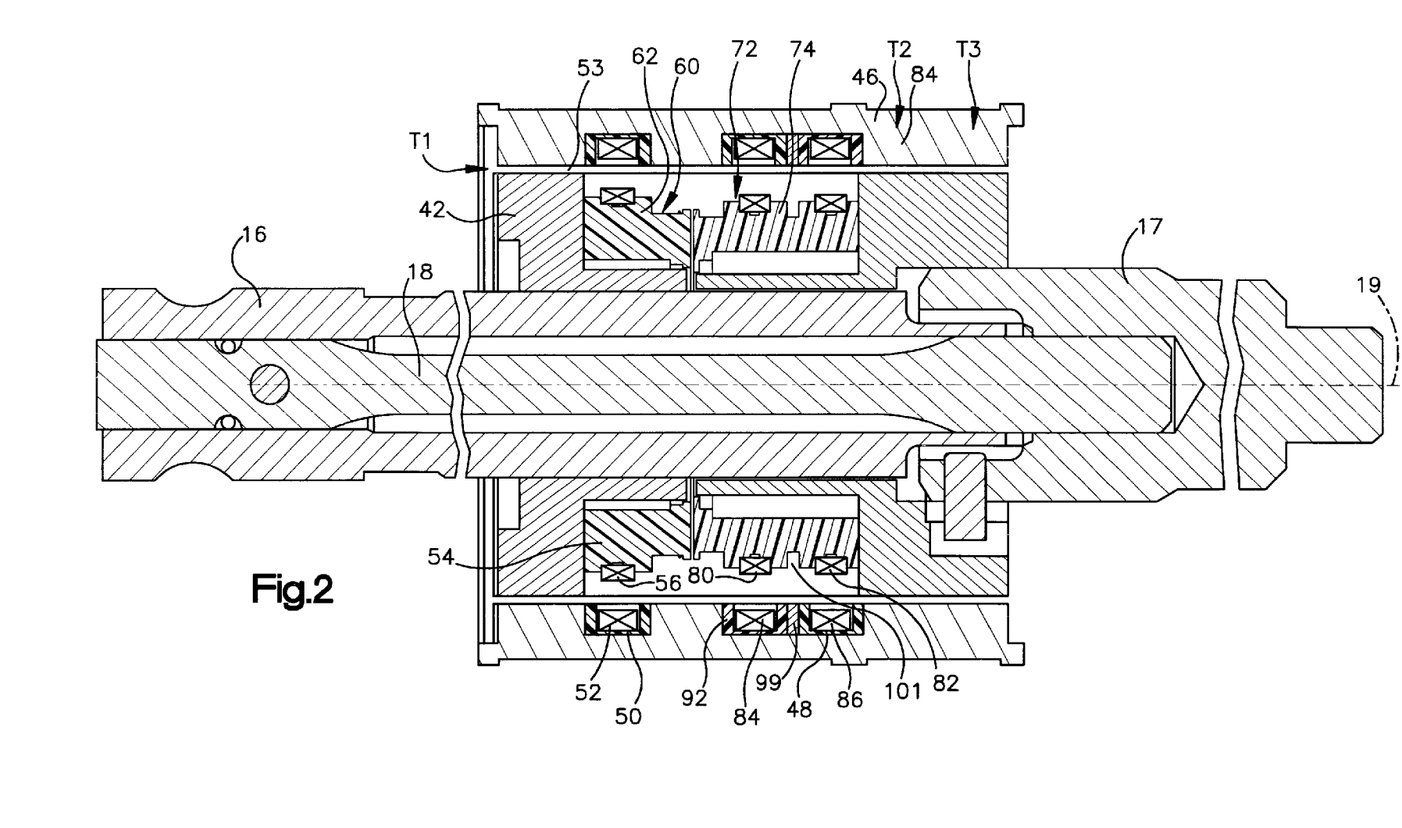
FIG. 2 is a sectional view illustrating a torque sensor constructed in accordance with the present invention.

Reference is now made to FIG. 2 which illustrates the torque sensor 32 in greater detail. The torque sensor 32 includes a torsion bar 18 which interconnects the steering wheel input shaft 16 with a pinion gear output shaft 17 in a known manner, such as described in U.S. Pat. No. 5,442,956. An annular input rotor 42 coaxially surrounds and is suitably mounted to the input shaft 16 for rotation therewith. Axially spaced from the input rotor 42, an annular output rotor 44 coaxially surrounds and is suitably mounted to the output shaft 17 for rotation therewith about the common axis 19. The input rotor 42 and the output rotor 44 are angularly movable relative to each other about the common axis 19. Torsion applied to the torsion rod 18 will result in relative angular rotation of the input rotor 42 with respect to the output rotor 44, the extent of which rotation is to be measured by the torque sensor 32 described herein.

The rotors 42 and 44 are coaxially surrounded by a stationary stator 46. The rotors 42 and 44 and the stator 46 may be constructed of metal, such as aluminum, or plastic. The rotors 42 and 44 and the stator 46 are not part of the magnetic circuit employed for sensing relative angular rotation between the rotors.

Figure 2A:
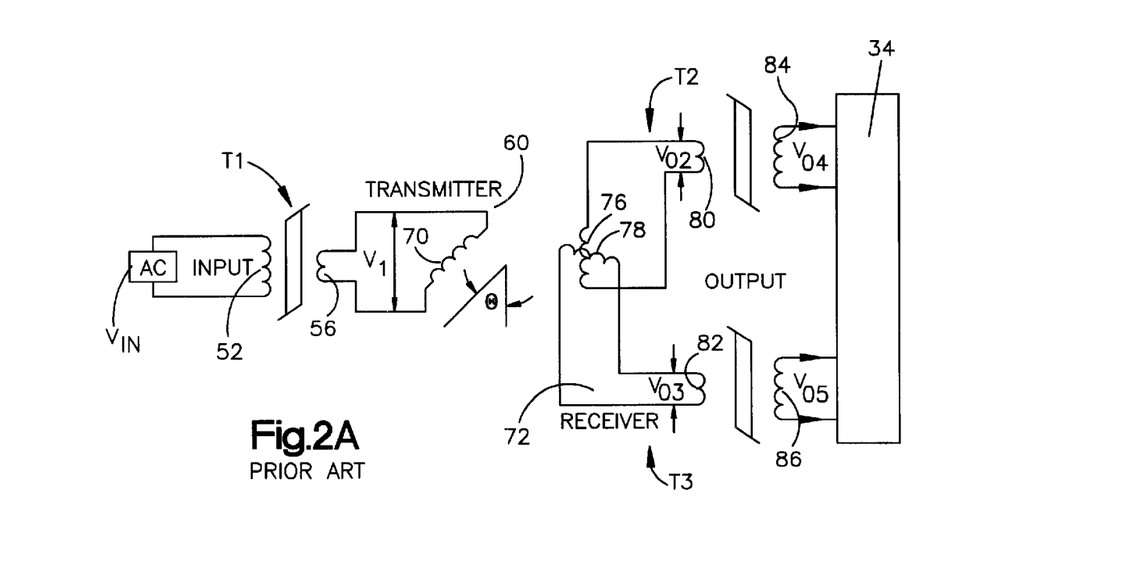
FIG. 2A is a schematic diagram of the circuitry employed in the present invention.

Before describing FIG. 2 in further detail, attention is briefly directed to the circuitry of FIG. 2A. The circuitry includes a rotary input transformer T1 having a stationary primary winding connected to an AC input voltage $V_{IN}$ and a rotary secondary winding. As will be brought out hereinafter, the rotary secondary winding coaxially surrounds and rotates with the input shaft 16 about the common axis 19. The secondary winding is electrically connected to a transmitter coil which is axially spaced therefrom and which also rotates with the input shaft 16 about the common axis 19. A pair of receiver coils are electrically displaced from each other. These receiver coils are axially spaced from the transmitter coil and rotate with the output shaft 17. The receiver coils are respectively connected to the primary windings of rotary output transformers T2 and T3. The primary windings of transformers T2 and T3 also rotate with the output shaft 17. The secondary windings of transformers T2 and T3 are stationary and provide a pair of output signals which are applied to the control circuit 34 for controlling the electric motor 26.

As shown in FIG. 2, the stator 46 carries an A annular transformer core 50 which coaxially surrounds a portion of the input rotor 42 and is spaced from the input rotor. As viewed in FIG. 2, the core 50 is U-shaped in cross-section, providing an annular channel for receiving and carrying a primary winding 52. The primary winding 52 carried by the transformer core 50 coaxially surrounds a portion of the input rotor 42.

Spaced radially inwardly across an air gap 53 there is provided an annular transformer core 54 which is carried by the rotor 42. The transformer core 54 carries a secondary winding 56 which coaxially surrounds a portion of the rotor 42 and is rotatable with the rotor about the common axis 19. The transformer core 50 and the primary winding 52 form the stationary portion of a transformer T1 and the transformer core 54 and the secondary winding 56 form the rotary portion of the rotary transformer T1. The transformer cores 50 and 54 are preferably constructed of a magnetically permeable material, such as powdered iron, ferrite filled plastic, or soft ferrite, to confine the magnetic circuit to the transformer cores which immediately surround the primary winding 52 and the secondary winding 56.

The transformer core 54 forms a portion of a rotary transmitter 60. The rotary transmitter 60 includes an annular transmitter core 62 which confines the sensor flux path. The rotary transmitter 60 further includes a transmitter coil 70 which is made of bendable magnet wire and which is described in greater detail hereinafter with reference to FIGS. 3A and 3B. The transmitter coil 70 is electrically connected with the secondary winding 56 of the rotary input transformer T1.

A rotary receiver 72 is axially spaced from the rotary transmitter 60. The rotary receiver 72 is carried by the output rotor 44 and rotates therewith about the common axis 19. The rotary receiver 72 has an associated receiver core 74 which is also mounted to the output rotor 44 and rotates therewith about the common axis 19. The receiver core 74 is preferably constructed of the same material discussed above with reference to the transformer core 54. The rotary receiver 72 carries first and second receiver coils 76 and 78, respectively which are described in greater detail hereinafter with reference to FIGS. 5A–8B. The second receiver coil 78 is angularly offset from the first receiver coil 76 and electrically insulated therefrom. The first receiver coil 76 is connected across the primary winding 80 of the rotary output transformer T2 and the second receiver coil 78 is connected across the primary winding 82 of the rotary output transformer T3. The secondary winding 84 of the transformer T2 and the secondary winding 86 of the transformer T3 are connected to the control circuit 34. The transmitter core 62 and the receiver core 74 serve to confine the flux paths to the respective magnetic circuit associated with each of the coils 70, 76, 78 and provide a high permeable magnetic return path for the flux from one pole to the next.

The transformer T2 has its primary circuit carried by the rotor 44. The receiver core 74 receives the primary winding 80 of the transformer T2. The secondary winding 84 of the transformer T2 is carried by the stationary stator 46. This includes an annular transformer core 92 which is radially spaced from and coaxially surrounds a portion of the rotor 44. The transformer core 92 is U-shaped in cross-section and defines a channel which faces toward the rotor 44 and which carries the stationary secondary winding 84 of the transformer T2. Thus, the secondary winding 84 is radially spaced from and coaxially surrounds the primary winding 80 on the receiver core 74.

The transformer T3 also has its primary circuit carried by the output rotor 44. The receiver core 74 also receives the primary winding 82 so that the primary winding coaxially surrounds a portion of the rotor 44 for rotation therewith about the common axis 19.

The secondary circuit of the transformer T3 is carried by the stationary stator housing 46. This includes a transformer core 98 which is an annular member coaxially surrounding and radially spaced outward from the rotor 44. The transformer core 98 is secured to the stator housing 46 and has a U-shaped cross-section which defines an annular channel facing toward the rotor 44. The U-shaped channel in the transformer core 98 carries the secondary winding 86 which coaxially surrounds and is radially spaced from the primary winding 82 of the transformer T3.

A spacer 99 separates the transformer cores 92 and 98 from each other to limit cross talk between the secondary windings 84 and 86, respectively, of the transformers T2 and T3. Similarly, an air gap 101 separates the primary windings 80 and 82 from each other to minimize cross talk between the primary windings 80, respectively, of the transformers T2 and T3.

Referring now to FIGS. 3A–4B, the transmitter core 62 has a face 100 extending radially between a cylindrical outer surface 102 and a cylindrical inner surface 104. A plurality of radially extending slots 106 in the face 100 divide the face into a plurality of transmitter pole segments 108. The transmitter pole segments 108 face towards similar pole segments on the receiver 72 described in detail below. In the illustrated embodiment, there are twelve transmitter pole segments 108 separated by twelve radially extending slots 106, with the slots being spaced 30° from each other about the common axis 19.

Each of the transmitter pole segments 108 is partially defined by a respective portion of the cylindrical outer surface 102 and a respective portion of the cylindrical inner surface 104. Each of the transmitter pole segments 108 is further defined by radially extending first and second side surfaces 112 and 114, respectively. Each of the first side surfaces 112 partially defines one of the plurality of radially extending slots 106 on one side of each transmitter pole segment 108. Each of the second side surfaces 114 partially defines another of the plurality of radially extending slots 106 on the other side of each transmitter pole segment 108.

The plurality of transmitter pole segments 108 comprises alternating first and second transmitter pole segments 120 and 122, respectively. Each of the first transmitter pole segments 120 is disposed circumferentially between two of the second transmitter pole segments 122. The transmitter coil 70 is attached to a pin 124 in the transmitter core 62 and wrapped in a counterclockwise direction, indicated by arrow A in FIG. 3B, around the transmitter core twice, as shown by arrow B in FIG. 3A, to form the secondary winding 56. The transmitter coil 70 is then directed toward the transmitter face 100 where a section is fed through a first one of the slots 106.

Figures 3A, 3B:
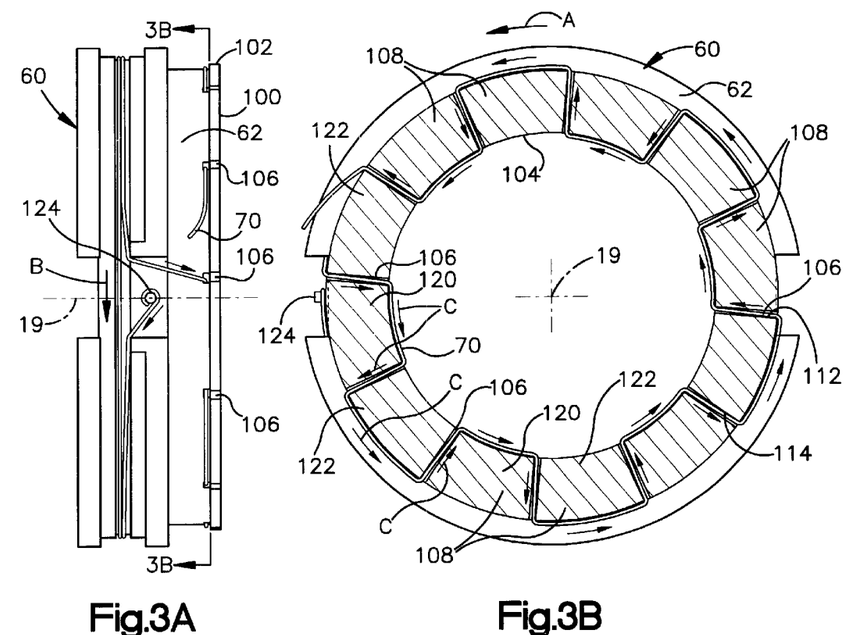
FIG. 3A is a side view of a first component of the torque sensor of FIG. 2, the first component being shown in an interim manufacturing condition.
FIG. 3B is a sectional view taken along line 3B—3B in FIG. 3A.
Figures 4A, 4B:
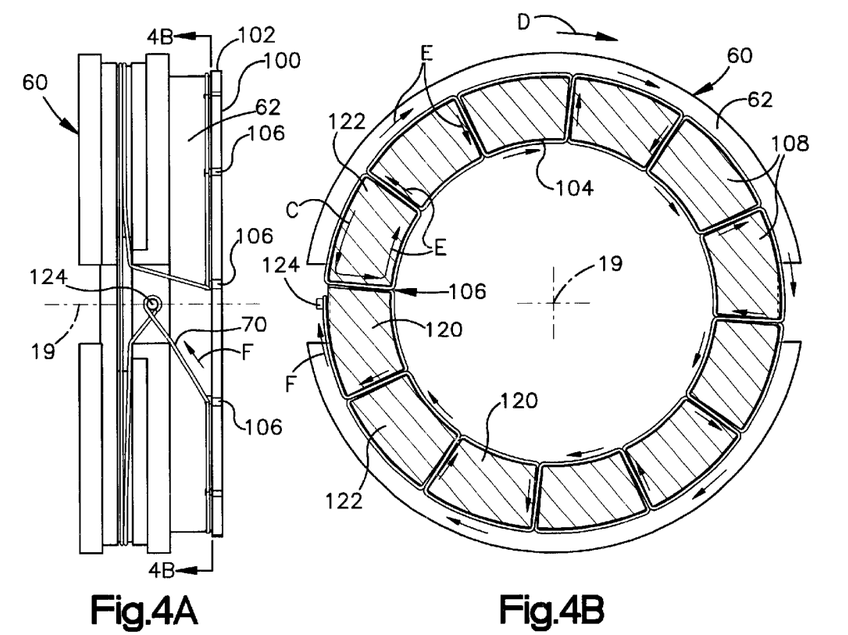
FIG. 4A is a side view of the first component of the torque sensor shown in FIG. 3A, the first component being shown in a completed manufacturing condition.
FIG. 4B is a sectional view taken along line 4B–4B in FIG. 4A.

The transmitter coil 70 is next wound in the counterclockwise direction in a weaving pattern indicated by the arrows C in FIG. 3B. The transmitter coil 70 extends around the respective portion of the cylindrical inner surface 104 defining each of the first transmitter pole segments 120, into each of the slots 106, and around the respective portion of the cylindrical outer surface 102 defining each of the second transmitter pole segments 122 as it is wound in the counterclockwise direction.

When the transmitter coil 70 is wound approximately 360° and is disposed adjacent the first one of the slots 106, another section of the transmitter coil is fed through the first one of the slots. The transmitter coil 70 is then wound in a clockwise direction indicated by arrow D in FIG. 4B in a weaving pattern indicated by arrows E. The transmitter coil 70 extends around the respective portion of the cylindrical inner surface 104 defining each of the second transmitter pole segments 122, into each of the slots 106, and then around the respective portion of the cylindrical outer surface 102 defining each of the first transmitter pole segments 120 as it is wound in the clockwise direction. During the clockwise winding of the transmitter coil 70, a section of the transmitter coil 70 overlaps the section of the transmitter coil placed in each of the slots 106 during the counterclockwise winding. The terminal end of the transmitter coil 70 is fed back to the pin 124, as indicated by arrow F in FIG. 4A, and soldered to the pin.

The rotary receiver 72 is illustrated in FIGS. 5A–8B. The receiver 72 is similar to the rotary transmitter 60, but differs therefrom in that the receiver has twice the number of pole segments and two coils 76 and 78. The receiver core 74 has a face 140 extending radially between a cylindrical outer surface 142 and a cylindrical inner surface 144. A plurality of radially extending slots 146 in the face 140 divide the face into a plurality of receiver pole segments 148. In the illustrated embodiment, there are twenty-four receiver pole segments 148 separated by twenty-four slots 146 spaced 15° apart.

Figures 5A, 5B:
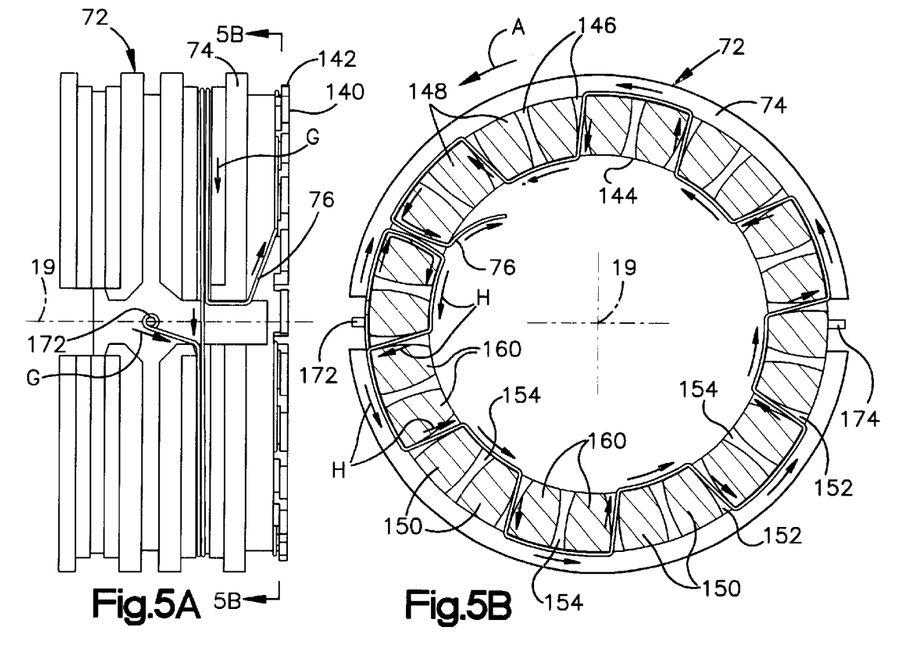
FIG. 5A is a left side view of a second component of the torque sensor of FIG. 2, the second component being shown in a first interim manufacturing condition.
FIG. 5B is a sectional view taken along line 5B—5B in FIG. 5A.
Figures 6A, 6B:
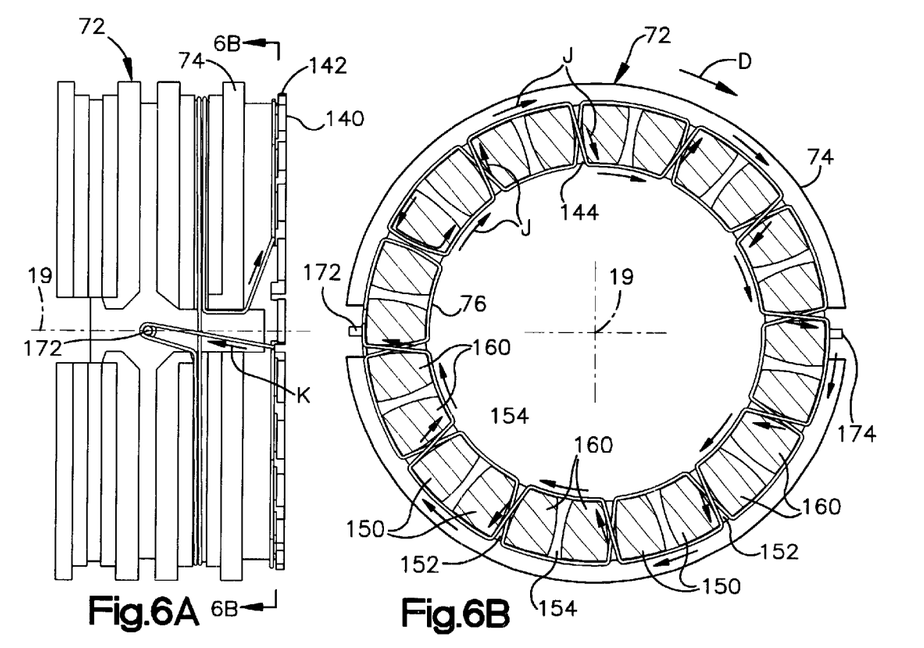
FIG. 6A is a left side view of the second component of the torque sensor shown in FIG. 5A, the second component being shown in a second interim manufacturing condition.
FIG. 6B is a sectional view taken along line 6B—6B in FIG. 6A.

The plurality of receiver pole segments 148 comprises alternating first and second receiver pole segment pairs 150 and 160. Each of the first and second receiver pole segment pairs 150 and 160 comprises an adjacent pair of the receiver pole segments 148. Each of the first receiver pole segment pairs 150 is disposed circumferentially between two of the second receiver pole segment pairs 160 and is separated from the second receiver pole segment pairs by a first group 152 of the plurality of slots 146 in the receiver face 140. A second group 154 of the plurality of slots 146 in the receiver face 140 extends between each of the adjacent receiver pole segments 148 in each of the first and second receiver pole segment pairs 150 and 160. Each of the first and second receiver pole segment pairs 150 and 160 is partially defined by a respective portion of the cylindrical outer surface 142 and a respective portion of the cylindrical inner surface 144.

Figures 7A, 7B:
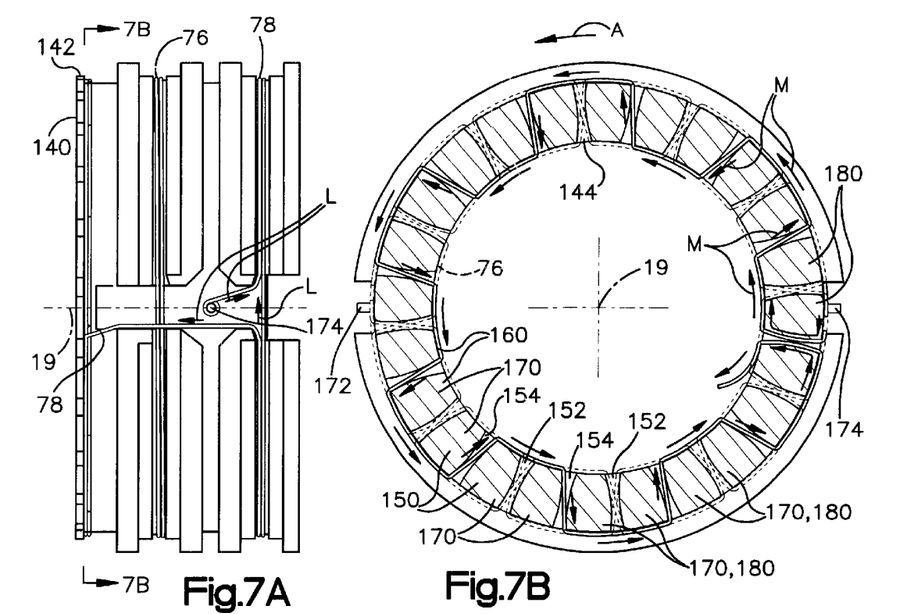
FIG. 7A is a right side view of the second component of the torque sensor shown in FIG. 6A, the second component being shown in a third interim manufacturing condition.
FIG. 7B is a sectional view taken along line 7B—7B in FIG. 7A.

The first receiver coil 76 completely encircles each of the first receiver pole segment pairs 150 and has two sections disposed in each of the first group 152 of slots 146 separating the first and second receiver pole segment pairs 150 and 160. The second receiver coil 78 completely encircles each of a plurality of combined receiver pole segment pairs 170 comprising one of the receiver pole segments 148 in the first receiver pole segment pairs 150 and an adjacently disposed one of the receiver pole segments 148 in the second receiver pole segment pairs 160. The second receiver coil 78 has two-sections disposed in each of the second group 154 of slots 146 extending between each of the adjacent pairs of the receiver pole segments 148 in each of the first and second receiver pole segment pairs 150 and 160.

The first receiver coil 76 is attached to a pin 172 in the receiver core 74 and wrapped in the counterclockwise direction A around the receiver core twice, as shown by arrows G in FIG. 5A, to form the primary winding 80. The first receiver coil 76 is then directed toward the receiver face 140 where a section of the coil is fed through a first one of the slots 146. The first receiver coil 76 is wound in the counterclockwise direction A in a weaving pattern indicated by arrows H in FIG. 5B. The first receiver coil 76 extends around the respective portion of the cylindrical inner surface 144 defining each of the first receiver pole segment pairs 150, into each of the first group 152 of slots 146, and around the respective portion of the cylindrical outer surface 142 defining each of the second receiver pole segment pairs 160.

When the first receiver coil 76 is wound approximately 360° and is disposed adjacent the first one of the slots 146, the first receiver coil is again fed through the first one of the slots. The first receiver coil 76 is then wound in the clockwise direction D in a weaving pattern indicated by arrows J in FIG. 6B. The first receiver coil 76 extends around the respective portion of the cylindrical inner surface 144 defining each of the second receiver pole segment pairs 160, into each of the first group 152 of slots 146, and around the respective portion of the cylindrical outer surface 142 defining each of the first receiver pole segment pairs 150. During the clockwise winding of the first receiver coil 76, a section of the first receiver coil overlaps the section of the first receiver coil placed in each of the first group 152 of slots 146 during the counterclockwise winding. The terminal end of the first receiver coil 76 is fed back to the pin 172, as indicated by arrow K in FIG. 6A, and soldered to the pin.

The second receiver coil 78 is attached to a second pin 174 on the opposite side of the receiver core 74 from the pin 172. The second receiver coil 78 is wrapped in the counterclockwise direction A around the receiver core 74 twice, as shown by arrows L in FIG. 7A, to form the primary winding 82. The second receiver coil 78 is then directed toward the receiver face 140 and a section of the coil is fed through one of the slots 146. The second receiver coil 78 is wound in the counterclockwise direction A in a weaving pattern as indicated by arrows M in FIG. 7B. The second receiving coil 78 extends around the respective portion of the cylindrical inner surface 144 of a first half 180 of the combined receiver pole segment pairs 170, into each of the second groups 154 of slots 146, and around the respective portion of the cylindrical outer surface 142 of a second half 182 of the combined receiver pole segment pairs 170. The first half 180 of the combined receiver pole segment pairs 170 and the second half 182 of the combined receiver pole segment pairs are alternately disposed relative to one another.

Figures 8A, 8B:
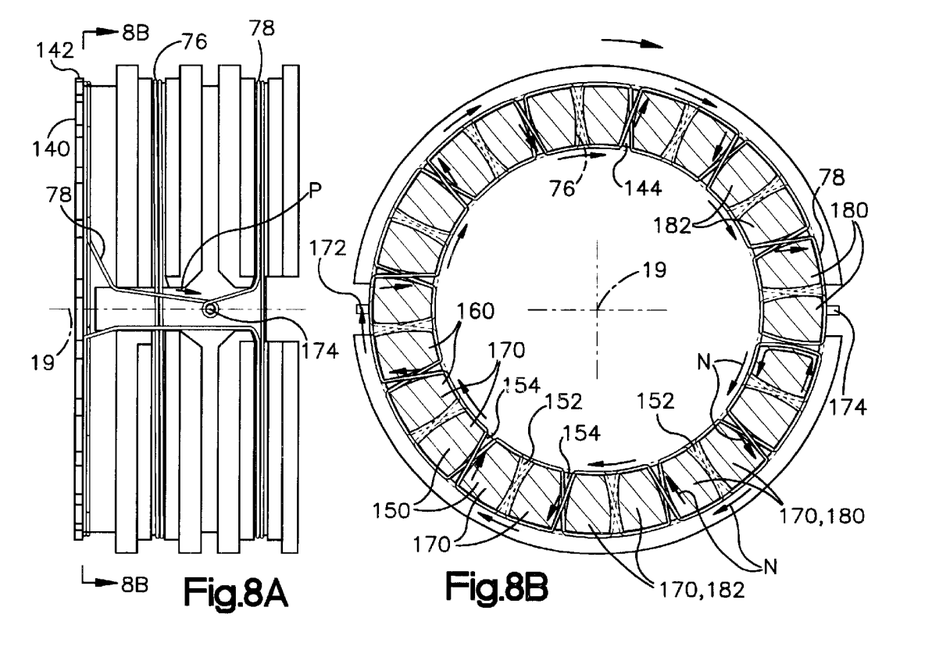
FIG. 8A is a right side view of the second component of the torque sensor shown in FIG. 7A, the second component being shown in a completed manufacturing condition.
FIG. 8B is a sectional view taken along line 8B—8B in FIG. 8A.

When the second receiver coil 78 is wound approximately 360°, the second receiver coil is wound in the clockwise direction D around the respective portion of the cylindrical inner surface 144 of the second half 182 of the combined receiver pole segment pairs 170, into each of the second group 154 of slots 146, and around the respective portion of the cylindrical outer surface 142 of the first half 180 of the combined receiver pole segment pairs 170. During the clockwise winding of the second receiver coil 78, a section of the second receiver coil overlaps the section of coil placed in each of the second group 154 of slots as the second receiver coil was wound in the counterclockwise direction. The terminal end of the second receiver coil 78 is fed back to the pin 174, as indicated by arrow N, and soldered to the pin.

The basic operation of the torque sensor 32 described herein is known from U.S. Pat. No. 5,442,956. Referring to FIG. 2A, the input $V_1$, and output $V_{O2}$, $V_{O3}$ voltages are shown. An excitation voltage into the transmitter section is:

$$V_1 = A \sin \omega \tau$$

where A is a constant, and wherein $\omega \tau$ is the frequency of excitation, typically 200 kHz. FIG. 2A shows the transmitter coil set 70 at an electromechanical angle $\Theta$ with respect to the receiver coils 76 and 78. $\Theta$ is the axial angle of electromechanical alignment between the transmitter 60 and the receiver 72, where 360° of $\Theta$ represents 2/P of a revolution and, where P is the number of segments. Thus, one electromechanical "revolution" is equal to 30 mechanical degrees. The output pattern of the voltage signals versus relative rotation between the transmitter 60 and the receiver 72 repeats itself twelve times per one mechanical revolution. This fact represents an amplified sensitivity of the sensor transfer function of output voltage amplitude versus mechanical rotation.

Since the conductor pattern has relatively narrow conductor paths and relatively larger coil areas, the inductive coupling between the transmitter coil 70 and receiver coils 76 and 78 is linearly proportional to the electromechanical angle $\Theta$ over a limited range. The winding patterns of the transmitter coil 70 and the receiver coils 76 and 78, respectively, provides the torque sensor 32 with improved signal to noise ratios and reduces part to part variation. Flux leakage is also reduced by completely encircling each transmitter pole segment with portions of the transmitter coil and each receiver pole segment with portions of the two receiver coils.

From the above description of the invention, those skilled in the art will perceive improvements, changes and modifications. Such improvements, changes and modifications within the skill of the art are intended to be covered by the appended claims.

Having described the invention, we claim:

1. A torque sensor for a power assist steering system for sensing applied torque between relatively rotatable input and output shafts, the input shaft being connected with the output shaft by a torsion element, said torque sensor comprising:

a rotary input transformer for providing an input signal, said rotary input transformer including a primary winding and a secondary winding;

a rotary transmitter connected for rotation with the input shaft, said rotary transmitter having a radially extending transmitter face divided into a plurality of transmitter pole segments by a plurality of radially extending slots, said rotary transmitter including a transmitter coil electrically connected with said secondary winding of said rotary input transformer, said transmitter coil completely encircling each of all of said transmitter pole segments individually and having two sections of said transmitter coil disposed in each of all of said plurality of slots, said rotary transmitter being operative to receive said input signal and a transmitted signal related to said input signal and transmit a transmitted signal related to said signal;

a rotary receiver axially spaced from said rotary transmitter and connected for rotation with the output shaft, said rotary receiver including at least one receiver coil for receiving a said transmitted signal; and a rotary output transformer including a primary winding and a secondary winding, said primary winding of said rotary output transformer being electrically connected with said at least one receiver coil, said rotary output transformer providing an output signal related to said transmitted signal.

2. The torque sensor of claim 1 wherein said rotary transmitter has a cylindrical outer surface and a cylindrical inner surface, each of said transmitter pole segments being partially defined by a respective portion of said cylindrical outer surface and a respective portion of said cylindrical inner surface.

3. The torque sensor of claim 2 wherein each of said transmitter pole segments is further defined by radially extending first and second side surfaces, each of said first side surfaces partially defining one of said plurality of radially extending slots on one side of each transmitter pole segment, each of said second side surfaces partially defining another of said plurality of radially extending slots on the other side of each transmitter pole segment.

4. The torque sensor of claim 3 wherein said plurality of transmitter pole segments comprises alternating first and second transmitter pole segments, each of said first transmitter pole segments being circumferentially disposed between two of said second transmitter pole segments.

5. The torque sensor of claim 4 wherein said transmitter coil is wound in a first direction around said respective portion of said cylindrical outer surface defining each of said first transmitter pole segments and around said respective portion of said cylindrical inner surface defining each of said second transmitter pole segments, a first one of said two sections of said transmitter coil being placed in each of said radially extending slots as said transmitter coil is wound in said first direction.

6. The torque sensor of claim 5 wherein said transmitter coil is wound in a second direction opposite said first direction around said respective portion of said cylindrical inner surface defining each of said first transmitter pole segments and around said respective portion of said cylindrical outer surface defining each of said second transmitter pole segments, a second one of said two sections of said transmitter coil being placed in each of said radially extending slots as said transmitter coil is wound in said second direction.

7. The torque sensor of claim 1 wherein said rotary input transformer has a stationary primary winding and a rotary secondary winding, said rotary second winding being drivingly connected for rotation with the input shaft and electrically connected to said transmitter coil for providing an input signal to said transmitter coil.

8. The torque sensor of claim 1 wherein said rotary output transformer has a rotary primary winding and a stationary secondary winding, said rotary primary winding being drivingly connected for rotation with the output shaft and electrically connected to said at least one receiver coil for receiving an output signal from said at least one receiver coil.

9. The torque sensor of claim 1 wherein said rotary receiver has a radially extending receiver face comprising a plurality of receiver pole segments, said at least one receiver coil completely encircling each of all of said receiver pole segments individually.

10. A torque sensor for a power assist steering system for sensing applied torque between relatively rotatable input and output shafts, the input shaft being connected with the output shaft by a torsion element, said torque sensor comprising:

a rotary input transformer for providing an input signal, said rotary input transformer including a primary winding and a secondary winding;

a rotary transmitter connected for rotation with the input shaft, said rotary transmitter including a transmitter coil electrically connected with said secondary winding of said rotary input transformer, said rotary transmitter being operable to receive said input signal and transmit a transmitted signal related to said input signal;

a rotary receiver axially spaced from said rotary transmitter and connected for rotation with the output shaft, said rotary receiver having a radially extending receiver face divided into a plurality of receiver pole segments by a plurality of radially extending slots, said rotary receiver including a receiver coil set for receiving said transmitted signal completely encircling each of all of said receiver pole segments individually, said receiver coil set having two sections disposed in each of all of said plurality of slots; and at least one rotary output transformer including a primary winding and a secondary winding, said primary winding of said at least one rotary output transformer being electrically connected with said receiver coil set, said rotary output transformer providing an output signal related to said transmitted signal.

11. The torque sensor of claim 10 wherein said plurality of receiver pole segments comprises alternating first and second receiver pole segment pairs, each of said first and second receiver pole segment pairs comprising an adjacent pair of said receiver pole segments, each of said first receiver pole segment pairs being disposed circumferentially between two of said second receiver pole segment pairs and being separated from said second receiver pole segment pairs by a first group of said plurality of slots in said receiver face, a second group of said plurality of slots in said receiver face extending between each of said adjacent pairs of said receiver pole segments in each of said first and second receiver pole segment pairs.

12. The torque sensor of claim 11 wherein said receiver coil set comprises a first receiver coil and a second receiver coil, said first receiver coil completely encircling each of all of said first receiver pole segment pairs and having two sections disposed in each of said first group of slots separating said first and second receiver pole segment pairs, said second receiver coil completely encircling each of all of a plurality of combined receiver pole segment pairs comprising one of said receiver pole segments in said first receiver pole segment pairs and an adjacently disposed one of said receiver pole segments in said second receiver pole segment pairs, said second receiver coil having two sections disposed in each of said second group of slots extending between each of said adjacent pairs of said receiver pole segments in each of said first and second receiver pole segment pairs.

13. The torque sensor of claim 12 wherein said at least one rotary output transformer comprises first and second rotary output transformers, said first rotary output transformer being electrically connected with said first receiver coil for receiving a first output signal from said first receiver coil, said second rotary output transformer being electrically connected with said second receiver coil for receiving a second output signal from said second receiver coil.

14. The torque sensor of claim 13 wherein each of said first and second rotary output transformers has a rotary primary winding and a stationary secondary winding, said rotary primary windings being drivingly connected for rotation with the output shaft.

15. The torque sensor of claim 13 wherein said rotary input transformer has a stationary primary winding and a rotary secondary winding, said rotary second winding being drivingly connected for rotation with the input shaft and electrically connected to said transmitter coil for providing an input signal to said transmitter coil.

16. The torque sensor of claim 12 wherein said rotary receiver has a cylindrical outer surface and a cylindrical inner surface, each of said first and second receiver pole segment pairs being partially defined by a respective portion of said cylindrical outer surface and a respective portion of said cylindrical inner surface.

17. The torque sensor of claim 16 wherein said first receiver coil is wound in a first direction around said respective portion of said cylindrical outer surface defining each of said first receiver pole segment pairs and around said respective portion of said cylindrical inner surface defining each of said second receiver pole segment pairs, a first one of said two sections of said first receiver coil being placed in each of said first group of slots as said first receiver coil is wound in said first direction.

18. The torque sensor of claim 17 wherein said first receiver coil is wound in a second direction opposite said first direction around said respective portion of said cylindrical inner surface defining each of said first receiver pole segment pairs and around said respective portion of said cylindrical outer surface defining each of said second receiver pole segment pairs, a second one of said two sections of said first receiver coil being placed in each of said first group of slots as said first receiver coil is wound in said second direction.

19. The torque sensor of claim 12 wherein said rotary receiver has a cylindrical outer surface and a cylindrical inner surface, each of said plurality of combined receiver pole segment pairs being partially defined by a respective portion of said cylindrical outer surface and a respective portion of said cylindrical inner surface.

20. The torque sensor of claim 19 wherein said second receiver coil is wound in a first direction around said respective portion of said cylindrical outer surface of a first half of said combined receiver pole segment pairs and around said respective portion of said cylindrical inner surface of a second half of said combined receiver pole segment pairs, said first half of said combined receiver pole segment pairs and said second half of said combined receiver pole segment pairs being alternately disposed relative to one another, a first one of said two sections of said second receiver coil being placed in each of said second group of slots as said second receiver coil is wound in said first direction.

21. The torque sensor of claim 20 wherein said second receiver coil is wound in a second direction opposite said first direction around said respective portion of said cylindrical inner surface of said first half of said combined receiver pole segment pairs and around said respective portion of said cylindrical outer surface of said second half of said combined receiver pole segment pairs, a second one of said two sections of said second receiver coil being placed in each of said second group of slots as said second receiver coil is wound in said second direction.

22. A torque sensor for a power assist steering system for sensing applied torque between relatively rotatable input and output shafts, the input shaft being connected with the output shaft by a torsion element, said torque sensor comprising:

a rotary input transformer including a primary winding and a secondary winding;

a rotary transmitter connected for rotation with the input shaft, said rotary transmitter having a radially extending transmitter face divided into a plurality of transmitter pole segments by a plurality of radially extending first slots, said rotary transmitter including a transmitter coil electrically connected with said secondary winding of said rotary input transformer, said transmitter coil completely encircling each of all of said transmitter pole segments individually and having two sections disposed in each of all of said plurality of transmitter slots;

a rotary receiver axially spaced from said rotary transmitter and connected for rotation with the output shaft, said rotary receiver having a radially extending receiver face divided into a plurality of receiver pole segments by a plurality of radially extending receiver slots, said plurality of receiver pole segments comprises alternating first and second receiver pole segment pairs, each of said first and second receiver pole segment pairs comprising an adjacent pair of said receiver pole segments, each of said first receiver pole segment pairs being disposed circumferentially between two of said second receiver pole segment pairs and being separated from said second receiver pole segment pairs by a first group of said plurality of receiver slots in said receiver face, a second group of said plurality of receiver slots in said receiver face extending between each of said adjacent pairs of said receiver pole segments in each of said first and second receiver pole segment pairs;

said rotary receiver further including a first receiver coil and a second receiver coil, said first receiver coil completely encircling each of all of said first receiver pole segment pairs and having two sections disposed in each of all of said first group of receiver slots separating said first and second receiver pole segment pairs, said second receiver coil completely encircling each of all of a plurality of combined receiver pole segment pairs comprising one of said first receiver pole segment pairs and an adjacently disposed one of said second receiver pole segment pairs, said second receiver coil having two sections disposed in each of all of said second group of receiver slots extending between each of said adjacent pairs of said receiver pole segments in each of said first and second receiver pole segment pairs; and first and second rotary output transformers each including a primary winding and a secondary winding, said primary winding of said first rotary output transformer being electrically connected with said first receiver coil and said primary winding of said second rotary output transformer being electrically connected with said second receiver coil.

\* \* \* \* \*

UNITED STATES PATENT AND TRADEMARK OFFICE
CERTIFICATE OF CORRECTION

PATENT NO. : 6,581,477 B1
DATED : June 24, 2003
INVENTOR(S) : Philip H. Berger, Don Blandino and Leonid V. Bogdanov It is certified that error appears in the above-identified patent and that said Letters Patent is hereby corrected as shown below:

<u>Column 9,</u>
Lines 21-22, after "and" delete "a transmitted signal related to said input signal and".
Line 23, after "said" insert -- input --.
Line 27, after "receiving" delete "a".

Signed and Sealed this

Thirteenth Day of July, 2004

JON W. DUDAS
*Acting Director of the United States Patent and Trademark Office*